United States Patent [19]
Carrick

[11] Patent Number: 5,215,576
[45] Date of Patent: Jun. 1, 1993

[54] WATER BASED SCRATCH-OFF INK FOR GAMING FORMS

[75] Inventor: Bryan W. Carrick, Gainesville, Ga.

[73] Assignee: GTECH Corporation, West Greenwich, R.I.

[21] Appl. No.: 734,967

[22] Filed: Jul. 24, 1991

[51] Int. Cl.$^5$ .................. C09D 11/00; B42D 15/00; B05D 1/36

[52] U.S. Cl. .................. 106/19 R; 106/404; 106/465; 283/97; 283/102; 283/901; 283/903; 427/155; 427/265; 427/288; 427/411

[58] Field of Search ............ 106/19 R, 404, 465; 283/97, 102, 901, 903; 427/7, 155, 265, 288, 411, 412

[56] References Cited

U.S. PATENT DOCUMENTS

| | | | |
|---|---|---|---|
| 4,174,857 | 11/1979 | Koza | 283/901 |
| 4,241,942 | 12/1980 | Bachman | 283/903 |
| 4,299,637 | 11/1981 | Oberdeck et al. | 427/7 |
| 4,671,512 | 6/1987 | Bachman et al. | 283/903 |
| 4,726,608 | 2/1988 | Walton | 283/901 |
| 4,738,473 | 4/1988 | Meloni et al. | 283/903 |
| 4,778,153 | 10/1988 | Bachman et al. | 283/903 |
| 5,000,486 | 3/1991 | Rua, Jr. et al. | 283/903 |
| 5,114,735 | 3/1992 | Rua, Jr. et al. | 427/155 |

OTHER PUBLICATIONS

"The Condensed Chemical Dictionary" 4th Ed. 1950, p. 345.

Primary Examiner—Mark L. Bell
Assistant Examiner—Helene Klemanski
Attorney, Agent, or Firm—Eckert, Seamans, Cherin & Mellott

[57] ABSTRACT

A scratch-off coating composition and method for application of the coating to lottery forms and the like employs a water based dispersion of acrylic resin, at approximately equal proportions of resin and water, by weight. The dispersion is adjusted to a pH greater than 7.0, and preferably a surfactant is added as a wetting, defoaming and/or dispersing agent. A pigment of metallic particles such as aluminum paste is added, together with a powdered filler such as calcium carbonate, at about 5 to 25% by weight of the coating composition. The composition can be applied in successive layers, including outer layers of relatively higher proportions of resin for improving wet rub resistance. For the outer surface layers, a number of ink formulations are disclosed.

18 Claims, 1 Drawing Sheet

WATER BASED SCRATCH-OFF INK FOR GAMING FORMS

BACKGROUND OF THE INVENTION

1. Field of the Invention

This invention relates to the field of scratch-off coatings for concealing information on forms such as lottery tickets, promotional forms, contest forms and the like, and in particular to a scratch-off coating composition in the form of a water based dispersion of acrylic latex and an opaque pigment, and methods for preparing and applying the coating composition.

2. Prior Art

It is known to print indicia on gaming forms such a lottery tickets, promotional forms and the like, which indicia is covered by an opaque scratch-off coating when the form is issued to the player. The coating must be sufficiently opaque to dependably conceal the indicia which may represent a winning ticket, and must be readily removable so that the player can read the information. The scratch-off coating can be a mixture of resin, rubber, solvent and pigment. When the coating is applied the solvent evaporates quickly and the pigment remains. A release coating such as clear varnish or pigmented varnish ink is applied to the form before the scratch-off coating is applied, and preferably over the indicia to be hidden. The release coating allows the player to remove the opaque cover coating by scratching the form with a fingernail, coin or the like.

Solvents in general present environmental and health dangers to humans. The solvents can be ingested by skin contact, by inhalation of vapors, etc. It is virtually unavoidable that workers in the field of solvent printing processes will become exposed to the solvents. Exposure to solvents is widely believed to increase the risk of cancer in humans. Assuming that those involved in the printing process avoid exposure by use of protective equipment, it is still a problem that waste materials, residual solvents in containers, solvents needed to clean operating apparatus, etc., often find their way into the environment. Over time, a facility which regularly handles solvents and materials prepared with, cleaned with or otherwise exposed to solvents, will accumulate potentially dangerous levels.

Known scratch-off coatings which use solvents typically include thermoplastic rubber and a pigment, providing a rubbery consistency for the coating, which is easily applied and readily scratched off. Whereas solvents are undesirable components for environmental reasons, it would be advantageous to provide a comparable coating material with a less dangerous carrier, which would still provide the desirable rubbery consistency, opacity, and ease of application.

Industry has attempted to develop coating products in general, including paints, inks and the like, which are carried in water rather than solvent. However, problems are encountered in attempting to provide a water based scratch-off ink, for example to be used for removably concealing information on lottery tickets, promotional forms and the like. Metallic pigments such as aluminum particles react in water to evolve hydrogen gas, a potential explosion problem. Water based acrylic resins also tend to form a film, which is undesirable in a printing process. It is difficult to provide a water based formulation which is relatively soft and rubbery, for easy scratch-off qualities, but is not tacky when dry or prone to build up on the printing head. For these and other reasons, an effective water based scratch-off ink has not heretofore been available.

SUMMARY OF THE INVENTION

It is an object of the invention to provide a water based scratch-off ink or coating composition that provides all the benefits of known solvent based compositions, and is readily and inexpensively made and applied.

It is a further object of the invention to prepare a scratch-off ink for concealing information on lottery forms and the like, from a mixture of acrylic latex, water, surfactants and pigment, for application to the lottery forms via flexographic or gravure printing.

It is another object of the invention to adjust the characteristics of an acrylic resin coating for tackiness, film formation and scratch-off facility, by including an acrylic resin and calcium carbonate filler material.

It is yet another objection of the invention to retard the reaction of metallic pigments with water, thereby inhibiting the evolution of hydrogen gas by adjusting the pH of the water based ink to neutral or only slightly basic.

These and other objects are met in a scratch-off coating composition and method for application of the coating to lottery forms and the like employing a water based dispersion of acrylic resin, at approximately equal proportions of resin and water. The dispersion is adjusted to a pH just slightly greater than 7.0, and preferably a surfactant is added as a wetting, defoaming and/or dispersing agent. A pigment of metallic particles such as aluminum is added, together with a powdered filler such as calcium carbonate. The coating can be applied in stages, including application of a relatively harder layer over a relatively more rubbery layer. A conductive layer can be interspersed to improve security and opacity of the form.

BRIEF DESCRIPTION OF THE DRAWINGS

There are shown in the drawings the embodiments of the invention as presently preferred. It should be understood, however, that the invention is capable of embodiment in other specific forms in accordance with the disclosure and claims, and is not limited to the exemplary embodiments shown in the drawings, wherein:

DETAILED DESCRIPTION OF THE PREFERRED EMBODIMENTS

Figure 1:
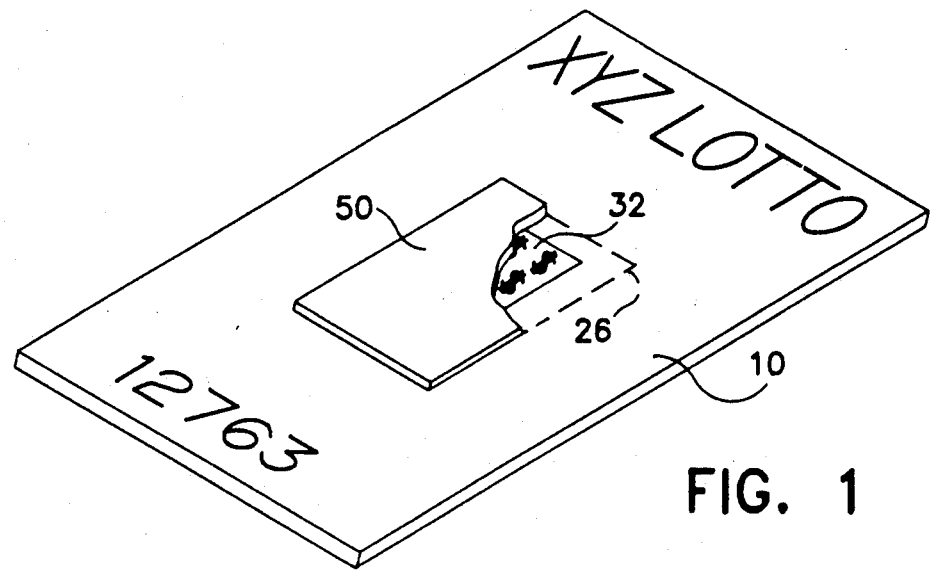
FIG. 1 is a plan view of a lottery form or the like, partly in section, coated with the composition of the invention.
Figure 2:
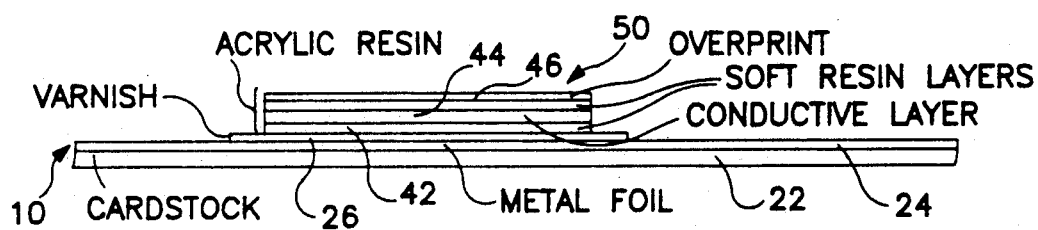
FIG. 2 is a partial side elevation of the form, showing the respective layers of the form in the area of the scratch off coating; and, FIG. 3 is a schematic illustration of the method for preparing the composition.
Figure 3:
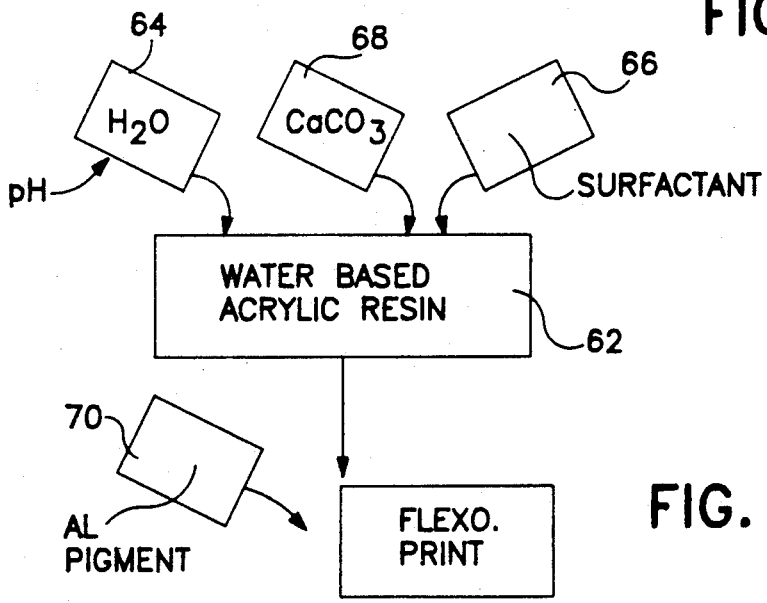

A lottery form, promotional form, contest form or other form 10 as shown in FIGS. 1 and 2 has a substrate which may be laminated layers of paper stock 22 and optionally metallic foil 24, the latter to render the form opaque. A varnish release layer 26 is applied to at least the are of the form which is to bear the indicia 32, concealed by scratch-off coating 50 and printed, for example under the varnish layer.

According to the invention the scratch-off coating comprises a water based acrylic resin 62, which is adjusted in pH by addition of alkaline water 64, modified using certain surfactants 66 which are discussed in detail hereinafter, and mixed with a filler 68 such as calcium carbonate powder, and a pigment 70. A variety of pigments are possible, and in connection with lottery tickets and the like, the interests of opacity and security favor a metallic pigment such as a paste of aluminum particles, which provides a grey or silver color.

Whereas metallic particles such as aluminum tend to react in water with the attendant release of hydrogen gas, the pigment can be added as a last step in preparation of the coating. Prior to addition of the aluminum, the pH of the coating composition is adjusted such that the resulting solution is only slightly basic, preferably having a pH of about 7.0 to 7.5. This can be done at the outset when mixing the acrylic resin with water, namely by adjusting the pH of the water by addition of ammonium hydroxide or the like, such that after addition of the remaining ingredients the pH is at the required, only slightly basic level. This prevents the chemical attack of the aluminum particles by acid or hydroxide ions in the water solution, and minimizes evolution of hydrogen gas.

The scratch-off coating can by applied, for example, by a flexographic printing technique in which the coating or ink is applied to a relatively pliable printing head and transferred by the head to the form. The ink can also be applied by gravure or other printing techniques. Preferably, a plurality of layers are applied successively after drying the previous layer. Although the same formulation could be applied for each layer, preferably according to the invention the formulations of the successive layers ar varied to achieve certain favorable characteristics for the scratch-off coating and the lottery form as a whole. The respective layers each comprise a water based acrylic resin according to the invention, and represent examples of the invention as follows.

EXAMPLE 1

An example of the coating according to the invention has been found to have appropriate properties for the first layer applied over the varnish release coat 26, and provides an even and opaque covering. This same formulation can be applied successively, preferably together with variations on the formulation for interleaved layers, and for the exposed outer layers. The ingredients of a formulation according to Example 1 are listed in Table 1, in the order in which they are mixed.

TABLE 1

| Metallic Silver/Grey | |
|---|---|
| Ingredient | Weight % in composition |
| HYCAR 26120 acrylic resin | 29.5% |
| Water (pH = 9.2) | 9.0 |
| Isopropyl alcohol | 8.0 |
| JONREZ D-2150 acrylic resin | 5.0 |
| DISPERSE-AYD W-22 dispersing agent | 1.0 |
| DAPRO W-77 wetting agent | 4.5 |
| GAMA-SPERSE-80 calcium carbonate powder | 22.0 |
| DAPRO DF-880 foam suppressor | 1.0 |
| STAPA HYDROXAL WHVII Aluminum Pigment Paste | 20.0 |

The first layer as shown in Table 1 preferably comprises a dispersion of at least one acrylic resin in water, at about equal proportions of water and resin material, and having a pH of about 7.0 to 7.5. A suitable acrylic resin is Hycar resin, available from the BFGoodrich Company, Specialty Polymers and Chemicals Division. The resin is an anionic emulsion of acrylic ester copolymer. The polymer is insoluble in water, but the dispersion or emulsion of polymer in water is dilutable. As supplied, the resin is 38 to 53% copolymer and 47 to 62% water. The Hycar resin has a relatively low pH when supplied, and is useful over a wide range of pH. By adding additional water at a higher pH of about 9.2, the resulting dispersion has a pH between 7.0 and 7.5 as required. The pH of the water can be raised, for example, by adding the required amount of ammonium hydroxide to bring the pH of the dispersion to near neutral or only slightly alkaline.

Isopropyl alcohol (i.e., IPA isopropanol, 2-propanol) is added to the resin/water dispersion as a defoaming agent. The isopropyl alcohol also tends to speed drying of the water based coating after application to the form by printing.

A filler material such as calcium carbonate powder is included to render the coating less mechanically strong, i.e., by providing shearable connections between the copolymer structures and thus preventing the formation of a film. Preferably a smaller quantity of a second and more dense acrylic resin is added to the HYCAR resin in order to better hold the filler material in dispersion. The second resin can be a relatively dense acrylic resin for this purpose, such as JONREZ D-2150, which is also supplied in a water dispersion. The proportion of D-2150, which is small compared to the proportion of HYCAR 26120, is such as to better hold the filler material against settling.

Prior to adding the filler material, preferably calcium carbonate powder ($CaCO_3$), the dispersion is adjusted by addition of surfactants W-22, which is a dispersing agent, and W-77, which is a wetting agent or interfacial tension modifier. These surfactants are available from Daniel Products Co., Jersey City, N.J. The W-22 further holds the calcium carbonate filler in dispersion. The filler is, for example, GAMA-SPERSE-80, available from the Georgia Marble Co., Kennesaw, Ga. Other possible fillers include clay, carbon black, and the like. A defoaming agent, DF-880, also available from Daniel Products Co., is then added.

The foregoing mixture provides a stable aqueous based acrylic resin dispersion, and can be stored safely. Before printing the coating on a substrate, the pigment is mixed in. The pigment comprises metallic particles, for example being an aluminum paste pigment such as STAPA HYDROXAL paste, sold by Obron Atlantic Corp. of Painesville, Oh.

The powdered filler of about 5 to 25% by weight, based on the weight of the coating composition, prevents the resin from forming a strong film when printed. The resin and pigment dispersion is opaque, creamy and relatively rubbery when applied. When printed over a release layer the coating is readily scratched off using a fingernail, coin or the like.

EXAMPLE 2

The scratch-off coating is preferably applied in plural layers. The composition of the subsequent layers can be modified in order to achieve additional objectives. In a second example of the water based composition, a quantity of conductive carbon black is added. The carbon black is an opaque pigment, and is electrically conductive. The ingredients and proportions of this example of the composition are listed in Table 2.

One possible way to view information concealed by a scratch-off coating is to charge the form electrostatically, apply a powder to the surface of the form, and attempt to discern the indicia under the scratch-off coating by noting the difference in adhesion of the powder to the surface caused by uneven charge on the form due to the indicia. The conductive carbon black helps to minimize the potential for viewing the information in this manner, by providing a conductive plane between the indicia and the surface. The charge at the surface of the form is substantially even. Additionally, the carbon black renders the coating grey or black, and improves opacity.

Example 2 is prepared substantially in the same manner as Example 1, with the addition of the carbon black pigment. The relative proportions of the HYCAR and JONREZ acrylic resins to the calcium carbonate filler in Example 2 are slightly higher than in Example 1, which renders the coating somewhat harder and/or more film-forming. Nevertheless the coating is readily scratched off.

TABLE 2

Grey/Black

| Ingredient | Weight % in composition |
|---|---|
| HYCAR 26120 acrylic resin | 32.24% |
| Water (pH = 9.2) | 9.84 |
| Isopropyl alcohol | 8.74 |
| JONREZ D-2150 acrylic resin | 5.47 |
| DISPERSE-AYD W-22 dispersing agent | 1.10 |
| DAPRO W-77 wetting agent | 4.91 |
| CDI-BS14759 carbon black aqueous dispersion | 12.41 |
| GAMA-SPERSE-80 calcium carbonate powder | 16.39 |
| DAPRO DF-880 foam suppressor | 1.09 |
| STAPA HYDROXAL WHVII Aluminum Pigment Paste | 7.81 |

Preferably, one further layer of the composition according to Example 1 is placed over the layer according to Example 2. The coating can be built up in this manner to the desired thickness and opacity as suitable for the particular security needs with a given form, e.g., lottery form, promotional game or the like.

The foregoing HYCAR resin examples produce a creamy or rubbery composition that is readily applied and readily scratched off when dry. However, inasmuch as the coating composition is a dispersion of particles which are insoluble in water, namely particles of resin, filler and optionally carbon black, the coating can be damaged by moisture. In handling the form, the moisture on a person's fingers can remove some of the coating. This aspect of the coating, known as the wet-rub resistance, can be improved by printing further layers over the coating composition using the water based inks of Examples 3 through 6, which are prepared in substantially the same manner as Examples 1 and 2, using the ingredients and proportions shown in Tables 3 through 6, respectively.

EXAMPLE 3

Example 3 is a base composition for a water based scratch-off ink to be applied over relatively softer underlayers. In comparison to Examples 1 and 2, the acrylic resin is a different material and is used in higher relative proportions, for better wet rub resistance in the surface layers of the scratch-off coating.

TABLE 3

Base

| Ingredient | Weight % in composition |
|---|---|
| CARBOSET GA-1086 acrylic resin | 45.01% |
| Water | 13.25 |
| Isopropyl alcohol | 9.26 |
| JONREZ D-2150 acrylic resin | 14.25 |
| DISPERSE-AYD W-22 dispersing agent | 1.28 |
| DAPRO W-77 wetting agent | 5.84 |
| GAMA-SPERSE-80 calcium carbonate powder | 10.40 |
| DAPRO DF-880 foam suppressor | 0.71 |

The CARBOSET GA-1086 acrylic resin is available from BFGoodrich Company, Specialty Polymers and Chemicals Division, Cleveland, Oh. GA-1086, like HYCAR 26120, is supplied as acrylic resina in water. GA-1086 has a pH range of 7 to 9. The base formulation according to Example 3 does not include aluminum paste pigment, and accordingly the pH of the dispersion is less critical.

The base according to Example 3 can be colored using a variety of pigments. Example 4 and corresponding Table 4 illustrate particular preferred ingredients and compositions for an opaque red ink which can be applied to the surface of the form over the layers applied as described above. Additionally, Table 5 is a list of additional pigments which can be used in similar formulations to obtain additional colors. It will be appreciated that the precise colors can be mixed as desired, as well as varied in brightness or rendered metallic, by varying the proportions of pigments in known manner. A more transparent dye can also be applied, for example using a solution of 56% water, 34% isopropyl alcohol and 10% dye such as BASONYL Red 560, Blue 636, etc. BASONYL dyestuffs are available from BASF Corp., Chemicals Div., Parsippany, N.J.

TABLE 4

Red Opaque

| Ingredient | Weight % in composition |
|---|---|
| CARBOSET GA-1086 acrylic resin | 31.60% |
| Water | 9.30 |
| Isopropyl alcohol | 6.50 |
| JONREZ D-2150 acrylic resin | 10.00 |
| DISPERSE-AYD W-22 dispersing agent | 0.90 |
| DAPRO W-77 wetting agent | 4.10 |
| GAMA-SPERSE-80 calcium carbonate powder | 7.30 |
| DAPRO DF-880 foam suppressor | 0.50 |
| NCA4600FW Calcium 2B | 12.80 |
| NC89-7141 White | 17.00 |

TABLE 5

Dyes and Pigments

| | |
|---|---|
| NC89-7141 | White |
| NC89-7120 | Diarylide Yellow |
| NCA4600FW | Calcium 2B Red |
| NC89-7121 | Red Lake "C" |
| NC89-7122 | Rubine Red |
| NC90-7092 | Rhodamine |
| NC90-7123 | Phthalo Blue |
| NC90-7005 | Victoria Blue |
| NC90-7042 | Methyl Violet |
| NC90-7090 | Cyan Green |
| NC89-7124 | Carbon Black |

It will be appreciated that the precise component materials used in the water based scratch-off formulations according to the invention can be varied to use different resins, different fillers, different dyes, etc. The foregoing disclosure of preferred ingredients is intended to be illustrative rather than limiting. Reference should be made to the appended claims rather than the foregoing specification in order to access the scope of the invention in which exclusive rights are claimed.

I claim:

1. A scratch-off coating composition, comprising:
   a dispersion of acrylic resin in an aqueous medium including water, at approximately equal proportions by weight;
   a pigment;
   a powdered filler of about 5 to 25% by weight, based on the weight of the coating composition; and,
   wherein the acrylic resin comprises at least two resins, and one of the resins is relatively more dense and operates to maintain the powdered filler in dispersion.

2. The composition according to claim 1, wherein the filler comprises calcium carbonate powder.

3. The composition according to claim 2, wherein the dispersion has a pH of about 7.0 to 7.5.

4. The composition according to claim 1, wherein the pigment comprises metallic particles.

5. The composition according to claim 4, wherein the pigment comprises aluminum particles.

6. The composition according to claim 1, further comprising at least one surfactant chosen from the group consisting of wetting agents, defoaming agents and dispersing agents.

7. A method for preparing a scratch-off ink, comprising the steps of:
   providing a dispersion of an acrylic latex resin in an aqueous solution including water at approximately equal proportions by weight;
   adding about 5 to 25% filler by weight of the coating composition;
   wherein the dispersion of the acrylic latex resin is provided with at least two resins, one of the at least two resins being relatively more dense and operating to maintain the filler in dispersion; and,
   adding a pigment.

8. The method according to claim 7, wherein the pigment is metallic.

9. The method according to claim 8, wherein the pigment includes aluminum particles.

10. The method according to claim 7, further comprising adding a surfactant to the dispersion, the surfactant comprising at least one of a wetting agent, a defoaming agent and a dispersing agent.

11. The method according to claim 7, wherein the filler includes calcium carbonate.

12. A method for preparing a gaming form having indicia concealed by a scratch-off coating, comprising the steps of:
    providing a base stock;
    printing the indicia on the base stock;
    applying a release coating to the base stock over the indicia;
    providing a coating composition including a dispersion of acrylic resin in an aqueous solution including water, at approximately equal proportions by weight, a pigment, and a powdered filler, the dispersion of acrylic resin including at least two resins, one of the at least two resins being relatively more dense and operating to maintain the powdered filler in dispersion;
    applying the dispersion to the base stock over the release layer; and,
    allowing the dispersion to dry.

13. The method according to claim 12, further comprising adding a surfactant to the dispersion, the surfactant comprising at least one of a wetting agent, a defoaming agent and a dispersing agent.

14. The method according to claim 12, wherein the pigment comprises metallic particles.

15. The method according to claim 14, wherein the pigment comprises aluminum particles.

16. The method according to claim 12, wherein the filler includes calcium carbonate powder.

17. The method according to claim 12, wherein the filler is added at about 5 to 25% by weight of the coating composition.

18. The method according to claim 12, wherein the pH is about 7.0 to 7.5.

* * * * *

UNITED STATES PATENT AND TRADEMARK OFFICE
CERTIFICATE OF CORRECTION

PATENT NO. : 5,215,576

DATED : June 1, 1993

INVENTOR(S) : Bryan W. Carrick

It is certified that error appears in the above-identified patent and that said Letters Patent is hereby corrected as shown below:

Column 1, line 15, change "a" to --as--.

Column 2, line 63, change "are" to --area--.

Column 3, line 32, change "ar" to --are--.

Signed and Sealed this

Twenty-eighth Day of December, 1993

*Attest:*

BRUCE LEHMAN

*Attesting Officer*     *Commissioner of Patents and Trademarks*